(12) United States Patent
Lee et al.

(10) Patent No.: US 9,777,621 B2
(45) Date of Patent: Oct. 3, 2017

(54) SEALING-COUPLED APPARATUS OF TURBOCHARGER

(71) Applicant: Hyundai Motor Company, Seoul (KR)

(72) Inventors: Seung Yeon Lee, Whasung-Si (KR); Jun Cheol Park, Whasung-Si (KR); Su Ho Lee, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 292 days.

(21) Appl. No.: 14/562,373

(22) Filed: Dec. 5, 2014

(65) Prior Publication Data

US 2016/0090904 A1  Mar. 31, 2016

(30) Foreign Application Priority Data

Sep. 26, 2014 (KR) .................. 10-2014-0128809

(51) Int. Cl.

| F01D 25/24 | (2006.01) |
|---|---|
| F02B 37/24 | (2006.01) |
| F01D 11/00 | (2006.01) |
| F02C 6/12 | (2006.01) |
| F02C 7/04 | (2006.01) |
| F02M 26/04 | (2016.01) |

(52) U.S. Cl.
CPC ............ *F02B 37/24* (2013.01); *F01D 11/005* (2013.01); *F02C 6/12* (2013.01); *F02C 7/04* (2013.01); *F02M 26/04* (2016.02); *F05D 2220/40* (2013.01); *F05D 2240/55* (2013.01); *Y02T 10/144* (2013.01)

(58) Field of Classification Search
CPC ........ F02B 37/24; F01D 11/005; F01D 25/24; F02C 6/12; F02C 7/04; F02M 25/0706; F05D 2220/40; F05D 2240/55
See application file for complete search history.

(56) References Cited

U.S. PATENT DOCUMENTS 8,333,556 B2 * 12/2012 Hettinger .............. F01D 17/165
  415/165

FOREIGN PATENT DOCUMENTS

| JP | 60184906 A | * | 9/1985 |
|---|---|---|---|
| JP | 63-143325 A | | 6/1988 |
| JP | 2004-132367 A | | 4/2004 |
| JP | 2006-125588 A | | 5/2006 |
| JP | 2009-534569 A | | 9/2009 |
| JP | 2010-285989 A | | 12/2010 |
| KR | 10-2007-0049801 A | | 5/2007 |
| KR | 10-2011-0023656 A | | 3/2011 |

* cited by examiner

*Primary Examiner* — Richard Edgar
(74) *Attorney, Agent, or Firm* — Morgan, Lewis & Bockius LLP

(57) ABSTRACT

A sealing-coupled apparatus of a turbocharger may include a vane cover installed in front of a turbine vane set in a turbine housing, the vane cover configured to cover the turbine vane and to define a fluid passage through which a fluid may be fed to an outlet hole extending in the turbine housing, and a sealing member having a tubular shape with a predetermined thickness, the sealing member being engaged with a front end of the vane cover and having an annular groove formed around an outer circumferential surface of the sealing member, with a sealing ring fitted over the groove and spacing the vane cover apart from the turbine housing in a radial direction.

4 Claims, 3 Drawing Sheets

SEALING-COUPLED APPARATUS OF TURBOCHARGER

CROSS REFERENCE TO RELATED APPLICATION

The present application claims priority to Korean Patent Application No. 10-2014-0128809, filed Sep. 26, 2014, the entire contents of which is incorporated herein for all purposes by this reference.

BACKGROUND OF THE INVENTION

Field of the Invention

The present invention relates, in general, to a variable geometry turbocharger (VGT), which is a family of turbochargers used to boost engines using exhaust gas and, more particularly, to a sealing-coupled apparatus of a turbocharger, which is configured to prevent damage or breakage of a turbine vane due to a thermal deformation of a turbine housing.

Description of Related Art

A turbocharger, which is a turbine-driven forced induction device used to increase the fuel economy in addition to being used to increase an engine's efficiency, power and torque, is installed in automobiles. In the related art, a wastegate valve turbocharger (WGT) is also used. The WGT is configured such that, when a boost pressure in the turbocharger is too high, the WGT can mechanically reduce the boost pressure by opening a wastegate valve and bypassing a part of exhaust gas via the opened wastegate valve. The WGT is configured to provide a predetermined pressure ratio at a predetermined engine rpm and a predetermined engine load, so the WGT can sufficiently boost the engine at high speeds, but may create turbo lag at low speeds, leading to a reduction in the performance of the WGT.

In recent years, because Euro-4 legislation became effective on passenger diesel engines, restrictions have been imposed on exhaust gas from passenger diesel engines. Therefore, installation of exhaust gas recirculation valves (EGR valves) and variable geometry turbochargers (VGT) in passenger diesel engines is now required. In comparison with general turbochargers, it is noted that the VGT can increase engine's efficiency, power, torque and the fuel economy to some degree.

In variable geometry turbochargers (VGT), to avoid undesired fixing of a turbine vane due to a thermal deformation of a turbine housing, an insert functioning as a vane cover is installed. Here, the insert is spaced apart from the turbine housing at a predetermined interval in an axial direction. A conventional insert used in the VGT is provided with a sealing structure on a tubular member set in the turbine housing. When the VGT is repeatedly operated under high temperature conditions, the insert may be deformed by a reaction force of the sealing structure caused by a thermal deformation of the turbine housing. When the insert is deformed as described above, the interval between the inner surface of the insert and the turbine vane is reduced, so the turbine vane may be damaged or broken due to rotational vibrations thereof.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a sealing-coupled apparatus of a turbocharger, which is configured to avoid thermal deformation of a turbine vane even when the vane is repeatedly operated under high temperature conditions.

In an aspect of the present invention, a sealing-coupled apparatus of a turbocharger may include a vane cover installed in front of a turbine vane set in a turbine housing, the vane cover configured to cover the turbine vane and to define a fluid passage through which a fluid is fed to an outlet hole extending in the turbine housing, and a sealing member having a tubular shape with a predetermined thickness, the sealing member being engaged with a front end of the vane cover and having an annular groove formed around an outer circumferential surface of the sealing member, with a sealing ring fitted over the groove and spacing the vane cover apart from the turbine housing in a radial direction.

The turbine housing is provided with a protruding ring formed by protruding inwardly to a predetermined height in a radial direction along an inner circumferential surface of the outlet hole at a location spaced apart from the sealing member by a predetermined distance, and the protruding ring is configured to be a stopper preventing the sealing member from being removed into the outlet hole.

The sealing member is provided with a step formed around an outer circumferential surface of an end of the sealing member at which the sealing member is combined with the vane cover, such that a thickness of the end of the sealing member is reduced by the step, the sealing member being combined with the vane cover, with a gasket set in the step.

The sealing member is provided with screw threads and the vane cover is provided with thread grooves, so that the vane cover and the sealing member are combined with each other in a screw engagement.

The above-mentioned sealing-coupled apparatus of the turbocharger according to the present invention is advantageous in that, unlike a conventional technique in which an insert functioning as a vane cover is installed and a sealing structure is provided on the outlet of the insert, the sealing-coupled apparatus of this invention is formed by combining a vane cover having no sealing structure with a sealing member produced separately from the cover. Thus, the sealing-coupled apparatus of this invention can efficiently prevent leakage of a fluid and can avoid direct transfer of the thermal deformation of a turbine housing exposed to high temperature conditions during operation to the vane cover, thereby preventing damage or breakage of a turbine vane due to the thermal deformation of the housing during operation under high temperature conditions, and increasing the durability and operational reliability of the turbocharger.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
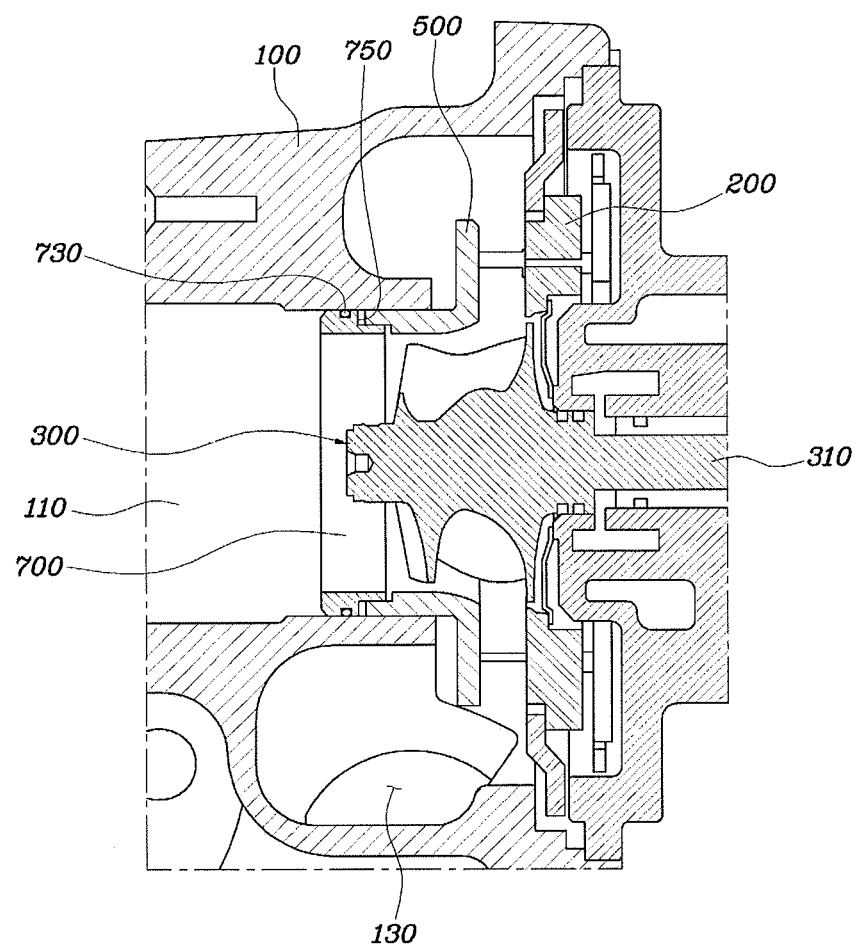
FIG. 1 is a sectional view illustrating a sealing-coupled apparatus of a turbocharger according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, a sealing-coupled apparatus of a turbocharger according to exemplary embodiments of the present invention will be described in detail with reference to the accompanying drawings.

FIG. 1 is a view illustrating a sealing-coupled apparatus of a turbocharger according to an exemplary embodiment of the present invention. As shown in FIG. 1, the sealing-coupled apparatus of the turbocharger according to the exemplary embodiment of the present invention includes: a vane cover 500 installed in front of a turbine vane 300 set in a turbine housing 100, the vane cover 500 functioning to cover the vane 300 and to define a fluid passage through which a fluid is fed to an outlet hole 110 extending in the housing 100, and a sealing member 700 having a tubular shape with a predetermined thickness, the sealing member 700 being engaged with a front end of the cover 500 and having an annular groove 710 formed around an outer circumferential surface of the sealing member 700, with a sealing ring 730 fitted over the groove 710 and spacing the cover 500 apart from the housing 100 in a radial direction.

The turbine vane 300 is provided on an end of a vane shaft 310 and is set in the housing 100 by both the vane shaft 310 and a vane base ring 200. In operation, a fluid is introduced into the housing 100 via an inlet hole 130 of the housing 100 and is compressed by the vane 300, and is discharged to the outside of the housing 100 via the outlet hole 110. The vane cover 500 is set in front of the vane 300 and defines the fluid passage through which the fluid is fed to the outlet hole 110 extending in the housing 100. Here, the vane cover 500 has a shape suitable to efficiently cover the vane 300, so the shape of the cover 500 corresponds to the shape of the vane 300. The cover 500 has a flat disc shape at a part surrounding the blades of the vane 300 and has a tubular shape at a central part thereof such that the tubular part of the cover 500 forms the fluid passage extending to the outlet hole 130.

The sealing member 700 having a tubular shape with a predetermined thickness is engaged with the front end of the cover 500. The outer circumferential surface of the sealing member 700 is grooved in a circumferential direction, so the annular groove 710 is formed around the outer circumferential surface of the sealing member 700. The sealing ring 730 having a shape corresponding to the shape of the groove 710 is fitted over the groove 710, and seals the junction between the housing 100 and the sealing member 700, thereby preventing a fluid (for example, exhaust gas) from leaking into the outlet hole 110 via the junction. Further, the sealing ring 730 fitted over the groove 710 spaces the cover 500 apart from the housing 100 at a predetermined interval in a radial direction. In an exemplary embodiment of the present invention, the sealing member 700 is installed in the turbine housing 100 in such a way that, although thermal deformation of the housing 100 during operation under high temperature conditions may be transferred to the sealing member 700, the cover 500 is efficiently isolated from the thermal deformation of the housing 100. Accordingly, the present invention can prevent damage or breakage of both the vane 300 and the cover 500, which may be caused by a thermal deformation of the housing 100 during operation under high temperature conditions, so the present invention can increase the durability and operational reliability of the turbocharger.

Figure 2:
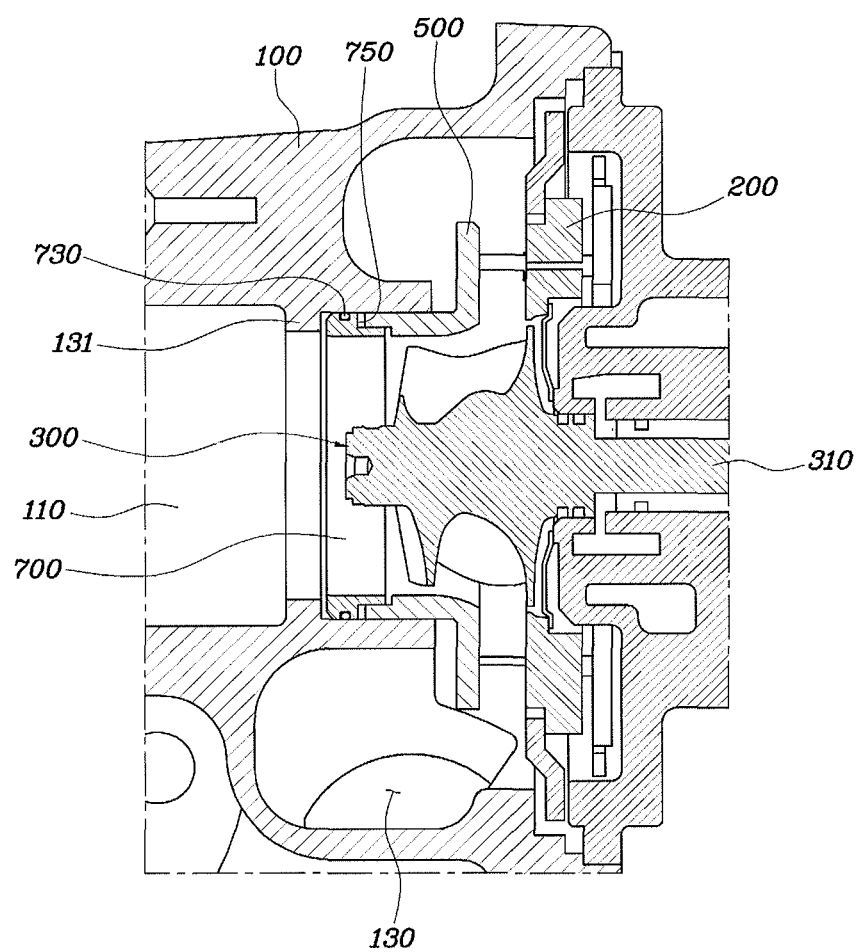
FIG. 2 is a sectional view illustrating a protruding ring formed in a turbine housing of FIG. 1.

Further, in the housing 100, at a location spaced apart from the sealing member 700 by a predetermined distance, a protruding ring 131 is formed by protruding inwardly to a predetermined height in a radial direction along the inner circumferential surface of the outlet hole 110, as shown in FIG. 2. The protruding ring 131 functions as a stopper preventing the sealing member 700 from being removed into the outlet hole 110 during operation. Accordingly, even when the turbocharger is repeatedly operated under high temperature conditions and operational vibrations and shock occur in the turbocharger, the protruding ring 131 can efficiently prevent the sealing member 700 from being removed into the outlet hole 110. Thus, in an exemplary embodiment of the present invention, heat from the housing 100 is transferred only to the sealing member 700, so the present invention can increase the durability of parts of the turbocharger.

Figure 3:
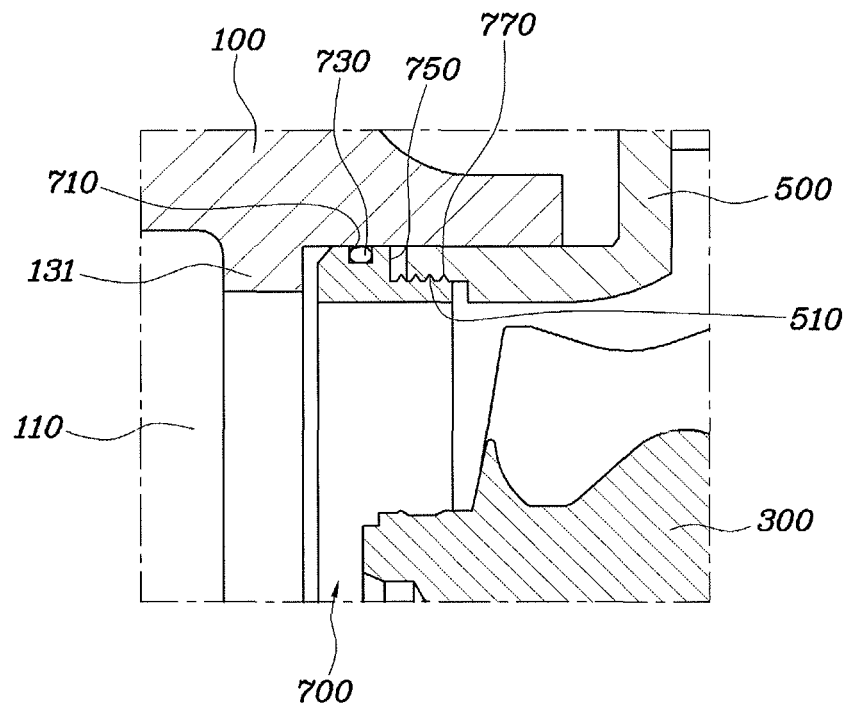
FIG. 3 is a sectional view illustrating a screw engagement of a sealing member with a vane cover.

As shown in FIG. 1, respective steps 750 may be formed on the cover 500 and the sealing member 700 at corresponding locations, so that the cover 500 and the sealing member 700 may be combined with each other by a sliding engagement. Alternatively, as shown in FIG. 3, screw threads 770 may be formed around the outer circumferential surface of the step of the sealing member 700, and thread grooves 510 may be formed around the inner circumferential surface of the step of the cover 500, so that the cover 500 and the sealing member 700 may be combined with each other in a screw engagement. Here, screw threads may be formed on the cover 500 and thread grooves may be formed on the sealing member 700.

Figure 4:
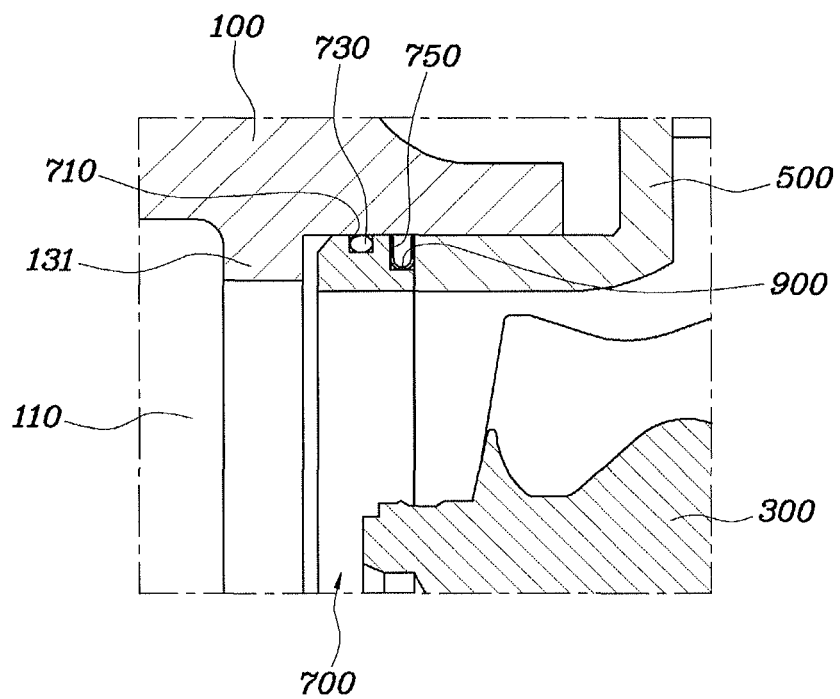
FIG. 4 is a sectional view illustrating a gasket set in a step of the sealing member.

As a further alternative, a step 750 may be formed around the outer circumferential surface of the end of the sealing member 700 at which the sealing member 700 is combined with the cover 500, as shown in FIG. 4. Due to the step 750, the thickness of the end of the sealing member 700 is reduced. In this case, the sealing member 700 may be combined with the cover 500, with a gasket 900 having a U-shaped, V-shaped or C-shaped cross-section set in the step 750. Here, the method of combining the sealing member 700 with the cover 500 may be freely changed according to operational conditions and designing requirements of the turbocharger.

The above-mentioned sealing-coupled apparatus of the turbocharger according to an exemplary embodiment of the present invention is advantageous in that, unlike a conventional technique in which an insert functioning as a vane cover is installed and a sealing structure is provided on the outlet of the insert, the sealing-coupled apparatus of this invention is formed by combining a vane cover having no sealing structure with a sealing member produced separately from the cover. Thus, the sealing-coupled apparatus of this invention can efficiently prevent leakage of a fluid and can avoid direct transfer of the thermal deformation of a turbine housing exposed to high temperature conditions during operation to the vane cover, thereby preventing damage or breakage of a turbine vane due to the thermal deformation of the housing during operation under high temperature conditions, and increasing the durability and operational reliability of the turbocharger.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A sealing-coupled apparatus of a turbocharger, the apparatus comprising:
    a vane cover installed in front of a turbine vane set in a turbine housing, the vane cover configured to cover the turbine vane and to define a fluid passage through which a fluid is fed to an outlet hole extending in the turbine housing; and
    a sealing member having a tubular shape with a predetermined thickness, the sealing member being engaged with a front end of the vane cover and having an annular groove formed around an outer circumferential surface of the sealing member, with a sealing ring fitted over the groove and spacing the vane cover apart from the turbine housing in a radial direction,
    wherein the sealing member is provided with a step formed around an outer circumferential surface of an end of the sealing member at which the sealing member is combined with the vane cover, such that a thickness of the end of the sealing member is reduced by the step, the sealing member being combined with the vane cover, with a gasket set in the step.

2. The sealing-coupled apparatus of the turbocharger of claim 1,
    wherein the turbine housing is provided with a protruding ring formed by protruding inwardly to a predetermined height in a radial direction along an inner circumferential surface of the outlet hole at a location spaced apart from the sealing member by a predetermined distance, and
    wherein the protruding ring is configured to be a stopper preventing the sealing member from being removed into the outlet hole.

3. A sealing-coupled apparatus of a turbocharger, the apparatus comprising:
    a vane cover installed in front of a turbine vane set in a turbine housing, the vane cover configured to cover the turbine vane and to define a fluid passage through which a fluid is fed to an outlet hole extending in the turbine housing; and
    a sealing member having a tubular shape with a predetermined thickness, the sealing member being engaged with a front end of the vane cover and having an annular groove formed around an outer circumferential surface of the sealing member, with a sealing ring fitted over the groove and spacing the vane cover apart from the turbine housing in a radial direction,
    wherein the sealing member is provided with screw threads and the vane cover is provided with thread grooves, so that the vane cover and the sealing member are combined with each other in a screw engagement.

4. The sealing-coupled apparatus of the turbocharger of claim 3,
    wherein the turbine housing is provided with a protruding ring formed by protruding inwardly to a predetermined height in a radial direction along an inner circumferential surface of the outlet hole at a location spaced apart from the sealing member by a predetermined distance, and
    wherein the protruding ring is configured to be a stopper preventing the sealing member from being removed into the outlet hole.

* * * * *